Patented Sept. 2, 1941

2,254,630

UNITED STATES PATENT OFFICE 2,254,630

PIGMENT MATERIAL AND PROCESS OF PRODUCING SAME

Roy W. Sullivan, Cragmere, Del., assignor to E. I. du Pont de Nemours & Company, Wilmington, Del., a corporation of Delaware No Drawing. Application June 4, 1938, Serial No. 211,797

22 Claims. (Cl. 106—294)

This invention relates to improved pigment materials and to processes of making the same. More particularly, it relates to the treatment of white inorganic pigment materials, especially white inorganic pigment materials comprising white, inorganic, relatively water insoluble compounds of calcium such as anhydride and gypsum, with naphthenic acid and/or salts of naphthenic acid.

The term naphthenic acid as used herein refers to cycloparaffinic carboxylic acids as found particularly in various petroleum oils. They are extracted from these oils or distillates thereof by processes well known in the art, such as by treatment of said oils or said distillates with aqueous sodium hydroxide solutions in which the acids dissolve yielding sodium salts. The lyes from this treatment are acidified, thereby yielding considerable amounts of free cycloparaffinic carboxylic acids. The raw salts and acids so obtained often contain considerable amounts of impurities, such as hydrocarbons, and are purified therefrom by such processes as alkaline distillation, extraction of alkali salts with solvents, or extraction of adherent mineral oils from aqueous solutions of the salts by means of gasoline in the presence of emulsion-precipitating salt solutions.

It is well known in the art that organic coating compositions comprising such pigment materials as titanium oxide, lithopone, zinc sulfide, and the like, and particularly organic coating compositions comprising high index of refraction white pigment materials such as titanium dioxide, zinc sulfide, and the like extended with such inorganic compounds of calcium as calcium sulfate, calcium carbonate, calcium sulfite, and the like, exhibit poor gloss and poor gloss retention characteristics, i. e. they produce films on wood, metal, oilcloth, linoleum, paper, and the like, which have an objectionably dull, matte appearance. Furthermore, it is well known in the art that organic coating compositions comprising calcium sulfate, for example calcium sulfate extended titanium dioxide pigments, have the undesirable property of being very sensitive to water, i. e. their viscosity is increased to an undesirable extent when said coating compositions are prepared or applied under conditions of high atmospheric humidity or if small amounts of water are added thereto. In addition, white inorganic pigment materials, particularly those comprising white inorganic compounds of calcium, exhibit gradual color changes such as yellowing when employed in such organic compositions as those of oils, gums, varnishes, rubber, plastics, and the like.

Moreover, such pigments often exhibit poor wetting characteristics and poor dispersion properties when incorporated in the aforementioned compositions. While a substantial improvement in the art with respect to the mixing and dispersion of lithopone in paint vehicles, for example, is disclosed in U. S. Patent 1,722,174, such pigment treatments produce pigments which cause an undesirable increase in the consistency or viscosity of coating compositions in which they are formulated.

This invention has as an object the production of white pigment materials, particularly pigment materials comprising white inorganic compounds of calcium, which exhibit improved gloss and improved gloss retention characteristics in organic coating compositions. A further object is the production of white pigment materials which exhibit improved wetting, mixing, and dispersion characteristics in oil, gum, varnish, plastics, and rubber compositions, without producing the increased consistency effected by prior art dispersing pigments. A still further object is the production of white pigments which exhibit improved film color in dried organic coating composition films. A still further object is the production of white inorganic pigment materials having superior tint retention as well as high resistance towards discoloration and yellowing in oils, gums, varnishes, plastics, rubber, and the like. A still further object is the production of calcium sulfate comprising pigments of reduced water sensitivity, i. e. the provision of calcium sulfate comprising pigments which in organic coating compositions produce coating compositions whose viscosity is little affected by the addition of small amounts of water or by atmospheric humidity. Additional objects will become apparent from an examination of the following description and claims.

These and other objects and advantages are accomplished by the following invention which broadly comprises adding to a white pigment material between about 0.05% to about 0.8%, based upon the weight of the pigment, of a naphthenate material.

In a more restricted sense this invention comprises adding to a white inorganic pigment material between about 0.05% to about 0.8%, based upon the weight of the pigment, of a naphthenate material.

The preferred embodiment of this invention comprises adding between about 0.2% to about 0.7%, based upon the weight of the pigment, of a naphthenic acid or a naphthenate to a white inorganic compound of calcium, preferably a calcium sulfate containing pigment, and subsequently dry milling said treated pigment material.

Various arrangements and selections of equipment for the operation of my process are possible. In the preferred arrangement, however, I feed a naphthenic acid in the amount of from about 0.2% to about 0.7%, based upon the weight of the pigment, to a calcined pigment material and thereafter dry mill said treated pigment material by passing it through a pulverizer, such as a ring roll mill equipped with air separator, and then through a disintegrator, such as a rotary hammer mill.

The following examples are given for illustrative purposes and are not intended to place any restriction on the herein described invention.

Example I

A commercial naphthenic acid was sprayed on a 70% $CaSO_4$–30% $TiO_2$ pigment as said pigment was being fed into a 50-inch ring roll mill equipped with air separator. The naphthenic acid was added in the amount of 0.5% on the basis of the weight of the pigment and said treated pigment was pulverized at the rate of 2,000 lbs./hour in said ring roll mill, and thereafter was disintegrated by passing it through a 24-inch rotary hammer mill at a rate of 2,000 lbs./hour. The resultant treated pigment of my novel process was definitely superior in wetting, mixing, fineness, water sensitivity, yellowing, and gloss characteristics, in organic coating composition vehicles, to a 70% $CaSO_4$–30% $TiO_2$ pigment identical in all respects and prepared in exactly the same manner as the novel pigment of my invention except that it was not treated with added naphthenic acid.

Example II

Twenty pounds of a commercial calcium naphthenate was melted by heating and added with stirring to a liquid composition consisting of 79 pounds carbon tetrachloride and 1 pound acetone. The resultant solution was sprayed on 4,000 pounds of a titanium calcium pigment consisting of 30% titanium dioxide and 70% calcium sulfate, said solution being added to said pigment immediately after the calcination operation in the manufacture of said pigment. Subsequently, the aforementioned treated pigment was dry milled by passage at the rate of 2,000 lbs./hour through a 50-inch ring roll mill equipped with air separator and a 24-inch rotary hammer mill in series. A prior art 30% titanium dioxide–70% calcium sulfate pigment was made by dry milling a portion of the aforementioned calcined pigment in exactly the same manner except that the treatment with the calcium naphthenate was omitted.

When formulated in a linseed oil enamel the prior art pigment produced enamels which formed dry films of fair color and gloss. However, after one month's exposure to north light said films yellowed to a very undesirable extent and were no longer glossy. The product of my invention, formulated in the same manner as the prior art pigment, produced dry enamel films having good color and gloss which after one month's exposure to north light were definitely superior, being very much less yellow and having very much better gloss than the exposed films comprising the prior art pigment. When formulated in a flat paint composition, comprising 0.5 per cent water by volume, the treated pigment of my novel process produced a paint having a viscosity, as measured on the Stromer Viscometer illustrated on page 575 of the 8th (January 1937) edition of "Physical and Chemical Examination of Paints, Varnishes, Lacquers and Colors," by Henry A. Gardner, which was 60 per cent lower than that of a corresponding flat paint composition made with the prior art pigment. The former paint was eminently suited for interior wall painting whereas the latter paint, comprising prior art pigment, was too viscous for practical application.

Example III 0.125 lb. of a commercial naphthenic acid and 25 lbs. of a titanium calcium pigment, consisting of 30% titanium dioxide and 70% calcium sulfate, were dry milled for 20 minutes in an edge runner mill to effect complete dissemination of the treating agent throughout the pigment. The treated pigment was subsequently disintegrated by passage through a squirrel cage disintegrator. A 25 lb. control sample of the same titanium calcium pigment was also dry milled for 20 minutes in an edge runner mill without addition of the naphthenate compound and was disintegrated by passage through a squirrel cage disintegrator. The treated pigment of my novel process was definitely superior to the untreated control pigment in wetting, mixing, fineness, water sensitivity, yellowing, and gloss characteristics. The fineness improvement amounted to a decrease of 75% in the number of grit particles per unit area of paint film. The improvements in wetting of the pigment in paint vehicle, as indicated by the length of mixing time required in a pony mixer to obtain a free flowing mixture of pigment and vehicle at both high and low atmospheric humidity, are tabulated below:

| Pigment | Mixing time to flow, minutes | | |
| --- | --- | --- | --- |
| | 50% humidity | 90% humidity | |
| | Formulation A[1] | Formulation A[1] | Formulation B[2] |
| Untreated control pigment | 2.0 | 79.0 | 23.0 |
| Treated pigment | 0.7 | 0.4 | 0.3 |

[1] Formulation A consisted of 489 grams pigment and 207 grams linseed oil comprising vehicle.
[2] Formulation B consisted of 600 grams pigment and 199 grams of China-wood oil—linseed oil—ester gum varnish.

Example IV

A sample of low oil absorption lithopone was slurried in 2 parts by weight of water, heated to about 50° C., and treated with 0.2% of a commercial naphthenic acid. After thorough mixing the slurry was adjusted to about 9.5 pH with a dilute solution of sodium hydroxide. The treated slurry was then filtered, dried, and the dry pigment disintegrated in the usual manner. A control sample was finished in exactly the same manner with the exception of the naphthenic acid treatment and both pigments were tested in parallel. The treated pigment had much better wetting and dispersing properties in paints than did the untreated pigment and furthermore, produced paints which had no higher consistencies than did those containing untreated pigment.

Example V

A sample of high oil absorption lithopone was slurried in 2 parts by weight of water, heated to about 50° C. and treated with 0.5% of a commercial naphthenic acid. After thorough mixing the slurry was adjusted to about 9.5 pH with a dilute solution of sodium hydroxide. The treated slurry was then filtered, dried and the dry pigment disintegrated in the usual manner. A control sample was finished in exactly the same maner with the exception of the naphthenic acid treatment and then both pigments were tested in parallel. The treated pigment had much better wetting and dispersing properties in paints than did the untreated pigment and furthermore produced paints which had no higher consistencies than did those containing the untreated pigment.

It is to be understood that the hereinbefore disclosed specific embodiments of my invention may be subject to variation and modification without departing from the scope of this invention. For instance, while the naphthenic acid and/or naphthenate agent must be intimately associated with and form a surface coating on the individual particles of the novel pigment products of my process, the agent may be added to said pigments in a variety of ways. As hereinbefore stated, the preferred method of treatment is to spray a naphthenic acid on the dry pigment and thereafter to dry mill said treated pigment by passing it through a pulverizer, such as a ring roll mill equipped air separator, and then to pass it through a disintegrator, such as a rotary hammer mill. However, the agent may also be added to dry pigment material which has been pulverized, in a ring roll mill for example, and thereafter said agent may be mixed intimately with said pulverized pigment by passage of the treated pigment through a disintegrator such as a rotary hammer mill. Again, the naphthenic acid or naphthenate, as for example a calcium naphthenate, may be dissolved in a low boiling point organic liquid, such as a mixture of 79 parts by weight of carbon tetrachloride and 1 part by weight of acetone, and may be sprayed on unground or pulverized pigment and thereafter intimately mixed with said pigment by dry milling, such as pulverizing followed by disintegrating, or by disintegrating alone. In another embodiment of my invention, an aqueous solution of a water soluble naphthenate, for example, a sodium or potassium naphthenate, is added to an aqueous suspension of pigment material, is adequately mixed therewith by stirring, and is thereafter precipitated on the surface of the pigment particles by acidification or by addition of an aqueous solution of an insoluble naphthenate forming metal ion. The pigment thus treated is then dewatered, dried and made ready for use by dry miling. In still another embodiment of my invention an aqueous dispersion of a naphthenic acid is added to an aqueous suspension of pigment, the resultant mixture is thereafter agitated to effect uniform distribution of the naphthenic acid agent, and is then dewatered, dried, and dry milled.

The term "naphthenate material," as used in the herein described disclosure and appended claims is intended to include naphthenic acid and salts of naphthenic acid, the term "naphthenic acid" being employed to designate all carboxylic acids which are to be found in crude petroleums or their distillates.

It is to be understood that the amount of naphthenate material which is added, according to my herein described invention, is critical to the results which are obtained. I have found that the optimum beneficial results are obtained only when the amount of naphthenate material which is added is within the range of about 0.05% and about 0.8%, based upon the weight of the pigment. Thus, if an amount in substantial excess of 0.8% is used, for example 1% or more, the beneficial results of this invention sharply diminish until a point is reached where the naphthenate material is actually detrimental to the pigment properties. Therefore, extreme care should be taken that the portions used are within the aforementioned range.

It is to be understood that the herein described invention is applicable to all types of white pigment materials consisting in whole or in part of such commodities or admixtures of such commodities as titanium oxide, titanates of divalent metals, zirconium oxide, zirconium silicate, lithopone, zinc sulfide, zinc oxide, antimony oxide, white lead, barium titanium silicate, anhydrite, gypsum, calcium carbonate, calcium sulfite, magnesium silicates, clay, barium sulfate, barium carbonate, silica, aluminum silicates, aluminum oxide, magnesium fluoride, sodium fluoride, aluminum fluoride, sodium fluosilicate, sodium aluminum fluoride, magnesium fluosilicate, pachnolite, calcium fluoride, and the like. However, it is further to be understood that the herein described invention is particularly applicable to white inorganic pigment materials consisting in whole or in part of such commodities or admixtures of such commodities as white, inorganic, relatively water insoluble compounds of calcium, particularly anhydrite and gypsum.

It is still further to be understood that in the case of such pigment materials as titanium oxide, lithopone, and the like, which are calcined during the process of manufacture of said pigments, the treating agent is added to the calcined pigment and not to the pigment before the calcination operation.

My process possesses advantages not previously combined in a single process. Furthermore, the products of my process possess advantages not previously combined in a pigment material. For example, my novel process allows the production of pigment materials, particularly calcium sulfate comprising pigment materials, which in organic coating compositions produce films of excellent gloss. Furthermore, such films on wood, metal, and the like retain this property of high gloss for a remarkably long period of time when exposed to atmospheric conditions. In addition, said films have much better color than those heretofore obtained with corresponding prior art pigments. Moreover, the products of my novel process permit paint manufacturers, for example, to effect appreciable savings in their paint grinding process. More than from about 15% to about 20% of the novel 30% $TiO_2$–70% $CaSO_4$ pigment of my invention, than of prior art corresponding pigment, can be mixed with a given quantity of paint vehicle in preparing a grinding base suitable for grinding in paint pebble mills, paint roller mills, and the like, thus increasing the capacity of said paint pebble mills or said paint roller mills by at least 15%. Furthermore, when said grinding pastes are reduced after grinding, to painting consistency by addition of additional vehicle to obtain the usual pigment/vehicle ratios, the consistencies of the paints comprising the novel products of my invention are substantially equal to those of the paints comprising the corresponding prior art pigments. Moreover, the pigment products of my process possess definitely improved yellowing resistance in organic compositions such as oils, gums, varnishes, plastics, rubber, and the like, in comparison to the yellowing resistance in such compositions of comparable pigments manufactured by prior art processes. My improved pigments also exhibit improved wetting, mixing, and dispersion characteristics, in oils, gums, varnishes, plastics, and rubber composition, without producing the increased consistency obtained with prior art dispersing pigments. In addition, calcium sulfate comprising pigments, treated according to my invention, exhibit markedly decreased water sensitivity characteristics in paints and the like.

As many apparently widely different embodiments of this invention may be made without departing from the scope and spirit thereof, it is to be understood that I do not limit myself to the specific embodiments thereof except as defined in the appended claims.

Having described the present invention the following is claimed as new and useful:

1. In a process for the production of improved dry pigments for use in organic media the step which comprises adding to a white pigment material between about 0.05% and about 0.8%, based upon the weight of the pigment, of a member selected from the group consisting of naphthenic acid and salts thereof, and thereafter milling to obtain intimate association of said naphthenate material and pigment.

2. In a process for the production of improved dry pigments for use in organic media the step which comprises adding to a white inorganic pigment material between about 0.05% and about 0.8%, based upon the weight of the pigment, of a member selected from the group consisting of naphthenic acid and salts thereof, and thereafter milling to obtain intimate association of said naphthenate material and pigment.

3. In a process for the production of improved dry pigments for use in organic media the step which comprises adding to a white inorganic compound of calcium between about 0.05% and about 0.8%, based upon the weight of the pigment, of a member selected from the group consisting of naphthenic acid and salts thereof, and thereafter milling to obtain intimate association of said naphthenate material and pigment.

4. In a process for the production of improved dry pigments for use in organic media the step which comprises adding to a calcium sulfate containing white pigment between about 0.05% and about 0.8%, based upon the weight of the pigment, of a member selected from the group consisting of naphthenic acid and salts thereof, and thereafter milling to obtain intimate association of said naphthenate material and pigment.

5. An improved dry pigment for use in organic media which comprises an intimate mixture of a white pigment material and between about 0.05% and about 0.8%, based upon the weight of the pigment, of a member selected from the group consisting of naphthenic acids and salts thereof.

6. An improved dry pigment for use in organic media which comprises an intimate mixture of a white inorganic pigment material and between about 0.05% and about 0.8%, based upon the weight of the pigment, of a member selected from the group consisting of naphthenic acid and salts thereof.

7. An improved dry pigment for use in organic media which comprises an intimate mixture of a white inorganic compound of calcium and between about 0.05% and about 0.8%, based upon the weight of the pigment, of a member selected from the group consisting of naphthenic acid and salts thereof.

8. An improved dry pigment for use in organic media which comprises an intimate mixture of a calcium sulfate containing pigment and between about 0.05% and about 0.8%, based upon the weight of the pigment, of a member selected from the group consisting of naphthenic acid and salts thereof.

9. A dry pigment comprising an intimate mixture of a zinc sulfide-containing pigment and between about 0.05% and about 0.8%, based upon the weight of the pigment, of a substance selected from the group consisting of naphthenic acid and salts thereof.

10. In a process for the production of improved dry pigments for use in organic media the step which comprises adding to an aqueous suspension of a white pigment material between about 0.05% and about 0.8%, based upon the weight of the pigment, of a member selected from the group consisting of naphthenic acid and salts thereof, and thereafter milling to obtain intimate association of said naphthenate material and pigment.

11. In a process for the production of improved dry pigments for use in organic media the step which comprises adding to a white pigment material between about 0.05% and about 0.8%, based upon the weight of the pigment, of calcium naphthenate, and thereafter milling to obtain intimate association of said naphthenate material and pigment.

12. In a process for the production of improved dry pigments for use in organic media the step which comprises adding to a white pigment material between about 0.05% and about 0.8%, based upon the weight of the pigment, of a member selected from the group consisting of naphthenic acid and salts thereof and thereafter milling to obtain intimate association of said naphthenate material and pigment by passing it through a ring-roll mill equipped with air separator and then through a rotary hammer mill.

13. In a process for the production of improved dry pigments for use in organic media the step which comprises spraying on a white pigment material between about 0.05% and about 0.8%, based upon the weight of the pigment, of a member selected from the group consisting of naphthenic acid and salts thereof, said added agent being dissolved in a low boiling point organic liquid, and thereafter milling to obtain intimate association of said naphthenate material and pigment by passing through a ring-roll mill equipped with air separator and then through a rotary hammer mill.

14. In a process for the production of improved dry pigments for use in organic media the step which comprises adding to a zinc sulfide containing pigment between about 0.05% and about 0.8%, based upon the weight of the pigment, of a member selected from the group consisting of naphthenic acid and salts thereof, and thereafter milling to obtain intimate association of said naphthenate material and pigment.

15. In a process for the production of improved dry pigments for use in organic media the step which comprises adding to a calcium sulfate containing white pigment between about 0.05% and about 0.8%, based upon the weight of the pigment, of a member selected from the group consisting of naphthenic acid and salts thereof, and thereafter milling to obtain intimate association of said naphthenate material and pigment by passing through a ring-roll mill equipped with air separator and then through a rotary hammer mill.

16. In a process for the production of improved dry pigments for use in organic media the step which comprises adding to a calcium sulfate containing titanium dioxide pigment between about 0.2% and about 0.7%, based upon the weight of the pigment, of a member selected from the group consisting of naphthenic acid and salts thereof and thereafter milling to obtain intimate association of said naphthenate material and pigment by passing through a ring-roll mill equipped with air separator and then through a rotary hammer mill.

17. In a process for the production of improved dry pigments for use in organic media the step which comprises adding to a zinc sulfide containing pigment between about 0.05% and about 0.8%, based upon the weight of the pigment, of calcium naphthenate, and thereafter milling to obtain intimate association of said naphthenate material and pigment.

18. A dry pigment comprising an intimate mixture of a white pigment material and between about 0.2% and about 0.7%, based upon the weight of the pigment, of a substance selected from the group consisting of naphthenic acid and salts thereof.

19. A dry pigment comprising an intimate mixture of a zinc sulfide containing pigment and between about 0.05% and about 0.8%, based upon the weight of the pigment, of calcium naphthenate.

20. An improved dry pigment for use in organic media which comprises an intimate mixture of a calcium sulfate containing titanium dioxide pigment and between about 0.05% and about 0.8%, based upon the weight of the pigment, of a substance selected from the group consisting of naphthenic acid and salts thereof.

21. An improved dry pigment for use in organic media which comprises an intimate mixture of a lithopone pigment and between about 0.2% and about 0.7%, based upon the weight of the pigment, of a member selected from the group consisting of naphthenic acid and salts thereof.

22. An improved dry pigment for use in organic media which comprises an intimate mixture of a lithopone pigment and between about 0.2% and about 0.7%, based upon the weight of the pigment, of calcium naphthenate.

ROY W. SULLIVAN.